Dec. 7, 1926.  
H. NYE  
1,609,493
ARTICLE OF MANUFACTURE AND METHOD OF MAKING THE SAME
Filed March 28, 1924
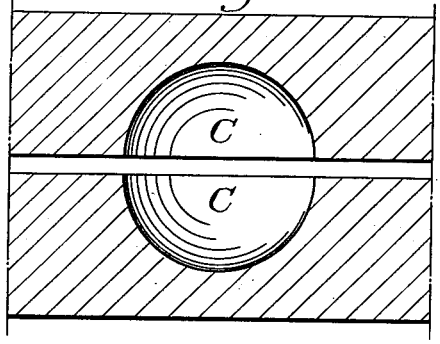
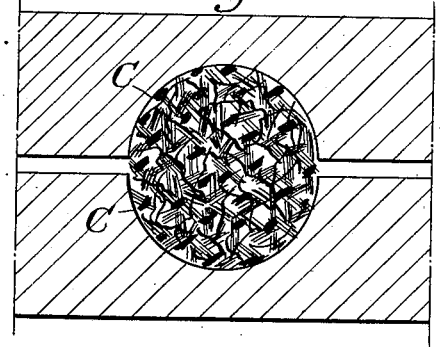
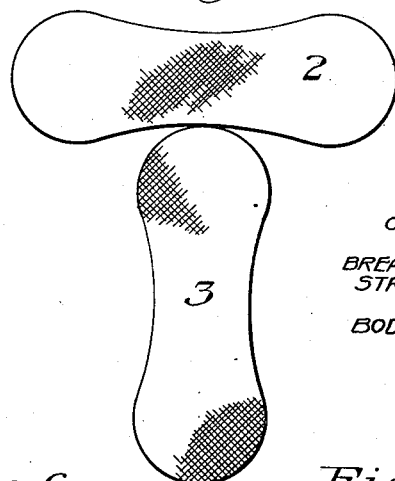
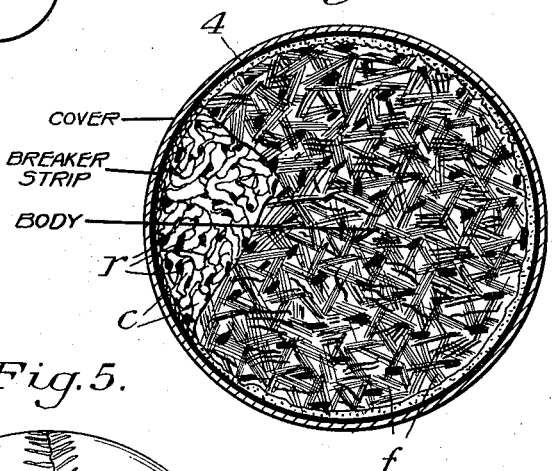
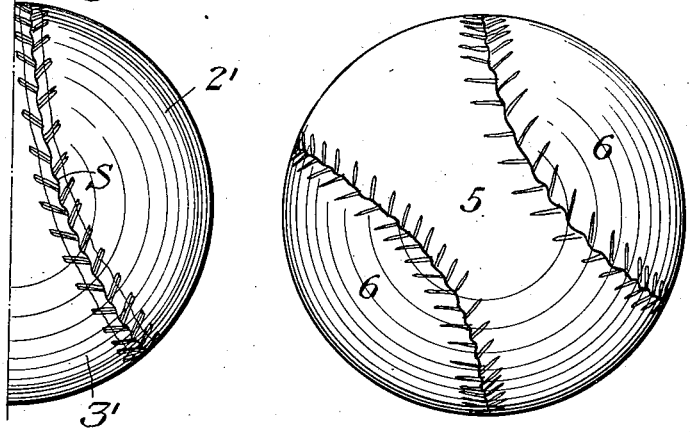
INVENTOR Patented Dec. 7, 1926.

1,609,493

UNITED STATES PATENT OFFICE.

HARRY NYE, OF AKRON, OHIO.

ARTICLE OF MANUFACTURE AND METHOD OF MAKING THE SAME.

Application filed March 28, 1924. Serial No. 702,553.

The present invention relates broadly to the art of manufacturing balls or fillers for balls, and more particularly to base balls, although, obviously, the invention is not limited to any particular form of ball.

It has heretofore been proposed, as illustrated, for example, in my prior Patent, No. 1,458,776, of June 12, 1923, to form balls substantially entirely from tire stock trimmings. Such balls have been found to be very useful for certain purposes, although it is somewhat difficult to obtain different weights, as may be required, while adhering to standard sizes. The large amount of rubber also greatly increases the resiliency of the ball, which, while highly advantageous for certain purposes, restricts its use in other fields.

I have found that by using ligneous particles, such as cork or wood chips, shavings or granules, either in place of the rubber, or in combination with the rubber and/or the fabric, I can produce a ball, or filler for balls, the characteristics of which, with respect to size, weight and resiliency, may be easily controlled. Such ligneous particles enable me to advantageously employ different pressures during the forming of the ball even with constant volumes and proportions, whereby the degree of compression may be partly relied upon to determine the resiliency. This adapts the invention to a greater variety of uses and, at the same time, enables the cost to be kept remarkably low.

By the term "ligneous", as used herein, I include not only cork, but also wood, and more particularly some of the lighter and more cellular wood, such as balsa, which has a relatively small amount of resinous materials such as tend to form gases when subjected to heat.

In the accompanying drawings I have illustrated more or less diagrammatically certain features of the present invention and method of carrying out the same, it being understood that the drawings do not define the limits of the invention as changes may obviously be made therein within the scope of my broader claims without departing from the spirit of the invention.

In the drawings:

Figure 1 is a partial sectional view of a conventional mold,

Figure 2 is a view similar to Figure 1 with the material in place for treatment, Figure 3 is a plan of the usual two-part ball cover, Figure 4 is a cross sectional view showing a completed ball.

Figure 5 is a perspective view of a completed ball having the cover sewed in position thereon, and Figure 6 is a view similar to Figure 5 illustrating a portion of a modified form of ball.

In carrying out the present invention I have found that very advantageous results are obtained, particularly in the manufacture of standard outdoor base balls, by the use of a composition containing the following materials in substantially the proportions set forth:

| | By weight. |
|---|---|
| Ligneous material, such as cork chips | 40% |
| Rubber or rubber cement | 30% |
| Fibrous material, such as short threads | 30% |

Trimmings of new stock for tires, such as usually considered largely as a waste material, are ordinarily composed of about equal parts of rubber and cotton fabric and, therefore, they may be effectively utilized for furnishing the rubber and fiber. The desired amount of such trimmings may be subjected to agitation in the presence of a suitable rubber solvent, such as gasoline, and thereby reduced to a cementitious mass of the desired consistency with the fibers thoroughly mixed throughout. Thereafter the cork particles may be added to the mass and thoroughly stirred into the same.

From this mix or batch I may form individual gobs of the desired weight for the article to be made. These gobs may then be placed within the mold cavities C as indicated in Figure 1, and the parts of the mold pressed together and subjected to the desired temperature conditions to effect either a partial or a complete cure, as may be desired. Thereafter, the formed body may be covered in any desired manner, as, for example, by using fabric sections 2 and 3 which may be cut from pieces of tire material, as shown in Figure 3. After these sections are applied, they may be vulcanized in position by placing the covered body in a second mold having a slightly larger internal diameter and subjecting it to a second heating. If a final cure be not effected by the first heating, this second heating will act as a final and complete cure. If the first cure be complete, the second heating will serve to vulcanize the fabric sections in place. This operation, in either case, joins the cover to the body of the ball so firmly that it will not become detached. The juncture lines between the sections of the cover material resemble seams and thereby provide a ball having the general appearance of the usual base ball.

Preferably, however, I will use a breaker strip of felt or other suitable and preferably resilient material. This may be accomplished by first providing a layer 4 of this material and thereafter applying the cover as set forth. The final heating will serve to secure firmly the breaker strip to the body of the ball, and, at the same time, it will also secure the cover sections to the breaker strip.

If it be desired to provide a cover of the usual type, leather sections 5 and 6 may be used and stitched together in the customary manner, either with or without providing a breaker strip as set forth. Where the breaker strip is provided, it tends to form a cushion between the cover and the body of the ball, thereby partially absorbing the shocks to which a ball would otherwise be subjected, and insuring a greater length of life. Where the ordinary cover is used, the breaker strip may be wrapped on the ball just before the cover is secured on.

It will be understood that the vulcanization of the various parts need not be effected unless desired, although it results in a united body and cover adapted to have a maximum life. The vulcanization, where used, may be effected either in one or two operations as pointed out. Where the vulcanizing is not desired, a rubber cement may be used which is adapted to become firmly set under pressure in the mold.

Cork has been found particularly useful in carrying out the present invention, due to its tendency, when once initially compressed, to thereafter always return to substantially the volume determined by the original compression, when subjected to shocks or blows. This insures added resiliency while permitting the total weight of the article to be changed by varying the relative amounts of the ligneous material and also varying the degree of compression to which the gob is subjected.

Where wood is used in place of cork it will preferably be one of the lighter woods, such as balsa, which has a very decided cellular structure and a minimum of constitutent parts adapted to form gases under the temperature conditions required for vulcanizing. This cellular structure is desirable due to the greater inherent resiliency after the wood has been subjected to pressure.

From the foregoing it will be apparent that I contemplate the use of different percentages of the respective materials as may be most advantageous for a given weight, size and resiliency, and also the use of different ligneous materials, as set forth. Various kinds of fibers may likewise be employed, since they serve essentially to bond more firmly and to interconnect the particles of the mass and to prevent separation or distortion.

In Figure 4 of the drawings I have illustrated a ball formed in accordance with the present invention which has been cut in half entirely by the use of a saw, whereby the fibers $f$ are partially pulled from the mass, thereby clearly disclosing them to view. In the smaller portion included within the broken line I have designated the result obtained by slicing away a portion of the body material by a sharp blade, which exerts no appreciable pulling action on the fibers. In this figure I have designated the cork particles $c$ and the intermediate masses of rubber as $r$.

In Figure 6 there is illustrated a slightly modified form of ball in which the sections 2' and 3' have been secured in position by a mold so constructed as to form an imitation seam S, thereby making the ball more nearly resemble a standard baseball of the general character shown in Figure 5. This seam may easily be formed in the second mold by the pressure to which the ball is subjected in securing the cover in position.

It will be understood that the fibers serve to unite firmly the ligneous material and rubber. I have found, however, that I can obtain very satisfactory results from the use of a ligneous filler with rubber or rubber cement without the use of fibers. In such cases the relative amounts of rubber and ligneous material may be varied as well as the amount of compression in accordance with the weight and resiliency to be obtained.

The advantages of the present invention arise from the use of a ligneous material, and more particularly cork, together with a fibrous binder. Other advantages arise from the increased resiliency and bonding resulting from the rubber or rubber cement where it is used.

Still further advantages arise from the provision of a breaker strip tending to yieldingly support the cover and also cushion shocks to the body of the ball.

I claim:

1. In the process of making a baseball having a solid base of rubber and fabric and a cover secured thereto, that step which consists in controlling the size, weight and resiliency of the ball by the addition of ligneous material to the base material.

2. In the process of manufacturing a baseball having a solid base comprising rubber and fiber and a cover of rubberized fabric affixed thereto, that step which consists in controlling the specific gravity and the resiliency of the ball by the addition of ligneous material to the base material.

3. In the process of manufacturing a baseball comprising a rubber and fiber molded base and a rubberized cover vulcanized thereto, that step which consists in controlling the size, weight and the resiliency of the ball by the addition of ligneous material to the composition.

4. The process of manufacturing a baseball comprising the steps of preparing a mass of rubber and fiber, adding thereto sufficient divided ligneous material to obtain the desired properties of density and resiliency, molding the composition thus formed into the shape of a sphere, and vulcanizing a cover of rubberized fabric to the mass to obtain a ball having the requisite properties of weight, resiliency, and durability for standard play.

In testimony whereof I have hereunto set my hand.

HARRY NYE.